INVENTOR
Paul Henri FORTIER

ATTORNEY

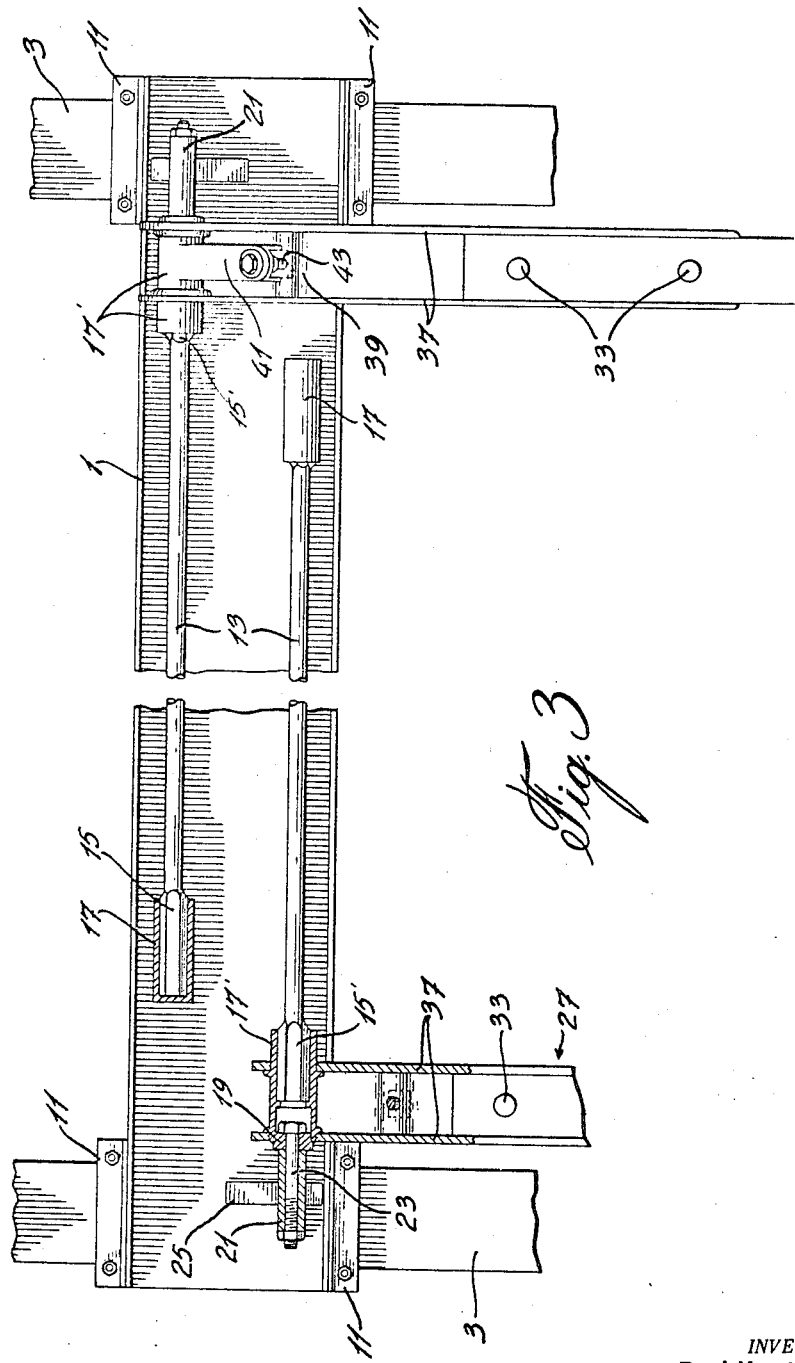

United States Patent Office 3,430,978
Patented Mar. 4, 1969

3,430,978
STABILIZING DEVICE FOR A VEHICLE
Paul Henri Fortier, 4467 Delanaudiere St.,
Montreal, Quebec, Canada
Filed Feb. 23, 1967, Ser. No. 618,041
U.S. Cl. 280—124               4 Claims
Int. Cl. B60g *11/10*

ABSTRACT OF THE DISCLOSURE

Stabilizing device for motor vehicle formed of a pair of parallel torsion rods extending transversely of the subframe of the vehicle and secured at one of their ends to the subframe with the other ends free. A pair of torque arms have one end fixed to the vehicle rear axle and the other end to one of the two torsion rods at the free end thereof.

---

The present invention relates to a stabilizing device for use on a vehicle, particularly a motor vehicle provided with a conventional wheel suspension such as an automobile.

It is known that a considerable number of road accidents happen as a consequence of the wheels on one side of a car inadvertently swerving into the soft shoulder alongside the road. It seems that this condition is dangerous because the friction power on the traction wheel riding on the soft shoulder is then substantially reduced but as soon as the driver manages to bring the said traction wheel back on the solid road, the friction power immediately and so suddenly picks up full strength that the driver often loses control of the vehicle, resulting in serious accident. This tendency appears to be more pronounced the greater the difference in level or hardness between the road and shoulder surfaces.

I have found that this situation may be much improved by ensuring a firmer grip or friction power on a traction wheel when the latter happens to be riding on the lower and/or softer road shoulder and thus substantially decrease the difference in friction power between the two rear traction wheels of a car when in the above-mentioned condition. The result is then to increase the stability of the car under such conditions.

By making the stabilizing device of my invention adjustable as to strength, as will hereinafter be explained, it is also possible to use it when it is desired to load the car while retaining its level.

The above-noted features of my invention can be obtained with a stabilizing device that generally comprises a pair of torsion rods intended to extend transversely of the subframe past the longitudinal center line of the vehicle and to terminate adjacent the traction wheels. One end of each torsion bar is mounted stationary with respect to the subframe while the other end is mounted for rotation relative thereto. There is provided a torque arm for each torsion rod, each arm having one end adapted to be mounted on the rear axle while the other end is fixed to the rotary end of the corresponding torsion bar.

In the preferred form of the invention, the torque arm comprises a centilever spring blade having, at one end, a connecting assembly for securing the blade on one of the torsion rods, the other end of the blade being secured to the rear axle. The connecting assembly comprises a connecting member which is loosely over the torsion rod and a pretorsion lever secured at one end to the torsion rod and finally includes tightening means between the other end of the lever and the connecting member, the assembly being constructed and arranged to force twisting of the torsion rod upon operation of the tightening means.

It is believed that a better understanding of the invention will be afforded as the following description proceeds having reference to the appended drawings wherein:

FIG. 3 is a transverse plan view, partly shown in cross section, of the torque lever of the stabilizing device.

Figure 1:
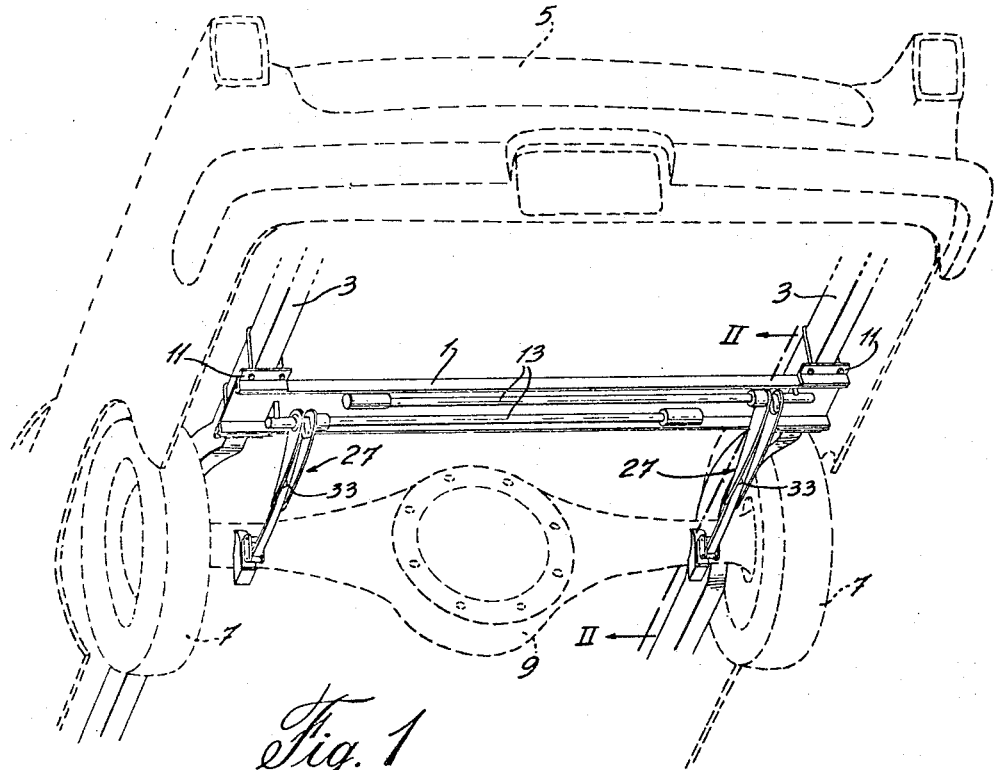
FIGURE 1 is a perspective view of the stabilizing device according to the invention, seen in full lines as mounted upon the rear end of a vehicle, shown in broken lines.

As shown in the drawing, the stabilizing device of the invention comprises an elongated channel-shaped support 1 extending transversely of the rear portion 3 of the subframe of the chassis of an automobile 5 having a pair of rear traction wheels 7 mounted on a rear transverse axle 9. Support 1 is fastened on to the subframe 3 by any known means such as the stirrup brackets 11 provided at each end of support 1.

Two torsion rods 13 are mounted on the said support 1, one of the ends thereof being formed as a polygonal block 15 inserted into a polygonal housing 17 fast with support 1 to prevent any relative displacement or rotation of block 15 and support 1. From FIGURES 1 and 3, it will be noted that blocks 15 are located on opposite sides of support 1, adjacent the wheels 7.

The second end of torsion rods 13 are similarly formed as polygonal blocks 15' receivable in similarly polygonal housings 17' to prevent relative rotation between blocks 15' and housings 17'. The latter are mounted for free rotation upon bearings 19 fixed to sleeves 21 by means of bolts 23 and fasten to pedestals 25 fixed to support 1 as by welding or any other conventional means. From this description, it will be understood that while the ends 15 are held stationary in relation to support 1, ends 15' can be rotated whereby to cause twisting of rods 13.

A pair of torque arms generally denoted by numeral 27 and each located adjacent one of the traction wheel 7 extends between the rear axle 9 and the torsion rod 13. Each torque arm 27 comprises a cantilever spring blade 29 having one end pivoted onto a swing shackle 30, the latter secured to a post 32 made solid, in any known manner, with axle 9. The other end of the blade is fixed to a connecting assembly 31 by means of rivets 33 or the like.

Figure 2:
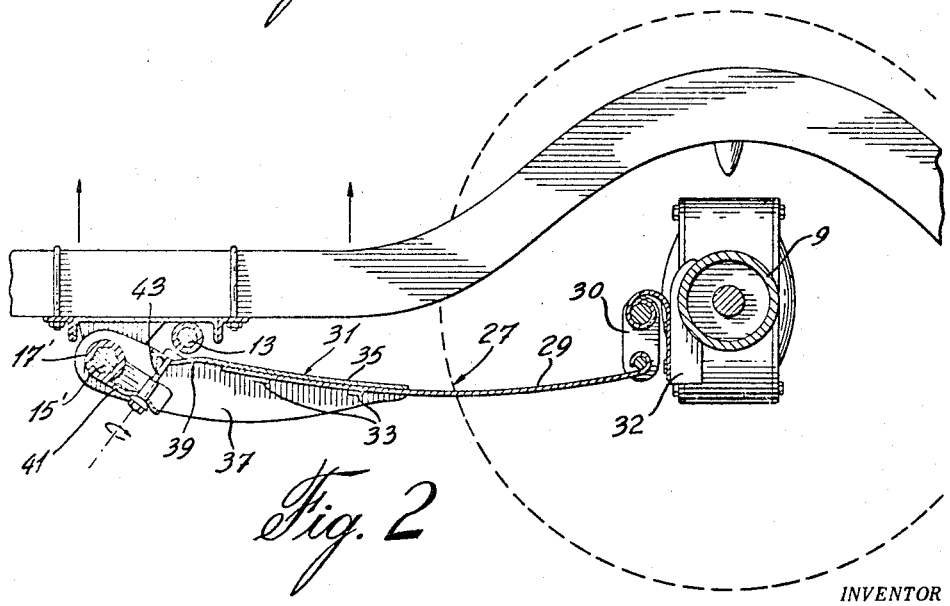
FIGURE 2 is a cross-sectional view taken along line II—II of FIGURE 1.

Each connecting assembly 31 comprises a channel-shaped connector 35 having a pair of depending flanges 37 and a web 39. The depending flanges 37 are mounted loosely over one of the housings 17' as best shown in FIGURES 2 and 3.

Adjusting means is provided in the connecting assemblies 31 to pretorsion the torsion rods 13. Each such means comprises a torque lever 41 located between the depending flanges 37 and tangentially projecting from the corresponding housing 17'. A bolt and nut assembly or any similar devices may be mounted between the said lever 41 and the web 39 of connector 35. It will thus be understood from perusal of FIGURE 2, that tightening of the bolt and nut assembly 43 will force torque lever 41 to rotate counterclockwise causing pretorsion in the corresponding rod 13. This pretorsion will be found convenient when the rear end of the car is loaded as it will serve to pick up the extra load put on, allowing the car to remain level as if unloaded.

As mentioned previously, I have found that the device of my invention also stabilizes the vehicle in case where the driver thereof is trying to bring one of the traction wheels 7 back onto solid road. The reason for this appears to be that if such a condition exists, the corresponding torque arm 27 and spring blade 29 will tend to drive the traction wheel 7 in firmer contact with the ground on which it stands, thus, increasing the friction power and decreasing the difference in traction power that exists between the two traction wheels 7 under the said condition.

I claim:
1. A stabilizing device for use on a vehicle having a pair of rear traction wheels provided on a rear axle over which is mounted a vehicle chassis including a subframe formed with a rear portion extending rearwardly of the axle and wheels, the said stabilizing device comprising:
   (a) a support adapted to extend transversely across said subframe and to be fixed thereto rearwardly of said axle;
   (b) a pair of torsion rods extending longitudinally of said support past the center thereof to terminate adjacent and traction wheels when said support is fixed to said subframe;
   (c) means holding one end of said rods, located on opposite ends of said support, stationary with respect to said support;
   (d) means mounting the other end of said rods, located on opposite ends of said support, for rotation relative to said support;
   (e) a torque arm for each torsion rod; said torque arms having means thereon at one end for mounting onto said axle, and
   (f) means rigidly fastening the other ends of said torque arm to the respective rotary ends of said torsion bars.
2. A device as claimed in claim 1, wherein each torque arm comprises a cantilever spring blade having, at one end, a connecting assembly for the securing of said blade on one of said torsion rods; the other end of said blade being mounted on to said rear axle.
3. A device as claimed in claim 2, wherein said connecting assembly includes means to pretorsion said one of said torsion rods.
4. A device as claimed in claim 3, wherein said connecting assembly comprises a connecting member loosely mounted over said torsion rod and said pretorsion means comprises a pretorsion lever secured at one end to said torsion rod and tightening means between the other end of said lever and said connecting member constructed and arranged to force twisting of said torsion rod upon operation of said tightening means.

References Cited

UNITED STATES PATENTS

| 3,095,213 | 6/1963 | Hair | 267—57 |
| 3,178,200 | 4/1965 | Backaitis | 280—124.3 |

FOREIGN PATENTS

| 1,152,024 | 7/1963 | Germany. |
| 958,720 | 2/1957 | Germany. |

PHILIP GOODMAN, *Primary Examiner.*

U.S. Cl. X.R.

267—57